United States Patent
Lehman et al.

(10) Patent No.: US 11,433,330 B2
(45) Date of Patent: Sep. 6, 2022

(54) FILTER SYSTEM AND METHOD

(71) Applicant: Caterpillar Inc., Deerfield, IL (US)

(72) Inventors: Martin A. Lehman, Congerville, IL (US); Lee A. Reiners, Emden, IL (US)

(73) Assignee: Caterpillar Inc., Peoria, IL (US)

( * ) Notice: Subject to any disclaimer, the term of this patent is extended or adjusted under 35 U.S.C. 154(b) by 39 days.

(21) Appl. No.: 16/415,696

(22) Filed: May 17, 2019

(65) Prior Publication Data
US 2020/0360840 A1    Nov. 19, 2020

(51) Int. Cl.
| B01D 35/147 | (2006.01) |
| B01D 29/15 | (2006.01) |
| B01D 35/153 | (2006.01) |
| F01M 11/03 | (2006.01) |
| F02M 37/22 | (2019.01) |

(52) U.S. Cl.
CPC .......... *B01D 35/147* (2013.01); *B01D 29/15* (2013.01); *B01D 35/153* (2013.01); *F01M 11/03* (2013.01); *F02M 37/22* (2013.01); *B01D 2201/0415* (2013.01); *B01D 2201/0461* (2013.01); *B01D 2201/167* (2013.01); *B01D 2201/291* (2013.01)

(58) Field of Classification Search
CPC .... B01D 35/147; B01D 29/15; B01D 35/153; B01D 2201/291; B01D 2201/0415; B01D 2201/0461; B01D 2201/167; B01D 29/0047; B01D 29/005; B01D 33/35; B01D 33/37; B01D 29/0056; B01D 33/806; B01D 33/804; B01D 21/34; B01D 21/30; B01D 27/10; B01D 27/14; B01D 35/157; B01D 24/002; B01D 29/50; B01D 29/52; B01D 35/30; B01D 2201/4023; B01D 27/108; F01M 11/03; F02M 37/22

USPC ...... 210/323.2, 97, 103–105, 130, 133, 241, 210/254, 260–262, 314, 340, 440–443, 210/90, 252, 335

See application file for complete search history.

(56) References Cited

U.S. PATENT DOCUMENTS

| 2,998,138 | A | | 8/1961 | Mould et al. | |
| 3,344,923 | A | * | 10/1967 | Pall et al. | B01D 35/147 210/90 |
| 3,397,786 | A | * | 8/1968 | Hultgren | B01D 27/106 210/132 |
| 5,160,037 | A | | 11/1992 | Lecour | |

(Continued)

FOREIGN PATENT DOCUMENTS

| CN | 201551906 U | 8/2010 |
| CN | 107747522 A | 3/2018 |
| JP | 2015025376 A | 2/2015 |

*Primary Examiner* — Madeline Gonzalez
(74) *Attorney, Agent, or Firm* — Bookoff McAndrews, PLLC

(57) ABSTRACT

According to one aspect of the present disclosure, a filter assembly includes a filter housing including a housing inlet and a housing outlet, and a filtering section located downstream of the housing inlet and upstream of the housing outlet. The filtering section includes a first filtering portion, a second filtering portion, a wall longitudinally separating the first filtering portion and the second filtering portion, a filtering outlet, and a valve located in the filtering outlet. The valve includes a closed condition and an open condition, and wherein, in the valve closed condition the valve blocks flow from the second filtering portion to the housing outlet.

19 Claims, 3 Drawing Sheets

(56) References Cited

U.S. PATENT DOCUMENTS

| | | | |
|---|---|---|---|
| 5,814,211 A * | 9/1998 | Leo | B01D 29/15 |
| | | | 210/90 |
| 2004/0217872 A1 | 11/2004 | Bhardwaj et al. | |
| 2012/0145625 A1 * | 6/2012 | Schiavon | B01D 35/1573 |
| | | | 210/420 |
| 2017/0298881 A1 | 10/2017 | Malgorn et al. | |

* cited by examiner

FILTER SYSTEM AND METHOD

TECHNICAL FIELD

The present disclosure relates generally to fluid filter systems, and more particularly, to a filter system that includes separate filtering portions.

BACKGROUND

Fluid filters are often used in mobile or stationary industrial equipment, such as construction equipment, mining equipment, and the like, to remove contaminants from various fluids used to power, lubricate, drive, and/or control the mechanisms and engines of the equipment. In one example, hydraulic motive systems use pressurized hydraulic fluid to drive and/or control various implements or systems of the equipment. The hydraulic motive systems use filters to clean the hydraulic fluid to operate the systems efficiently over long periods of time without malfunction or excessive wear. For example, hydraulic fluid supply tanks may be difficult to clean and may contain dirt, residue, or other particulate material, or the hydraulic fluid may collect particulate material during flow through the systems. Similarly, fuel systems use filters to clean fuel to operate properly and avoid excessive wear.

With this dependence on filters, comes the need to avoid overloading the filter. Overloading a filter my cause undesired pressures restrictions in the system, and may reduce filter efficiency. To avoid overloading, filters need to be cleaned or replaced before the overloading occurs. It can be difficult, however, to accurately determine when a filter needs to be cleaned or replaced.

An exemplary filter system is disclosed in U.S. Pat. No. 2,998,138 ("the '138 patent") to Mould et al. The '138 patent discloses a filter system with a pair of concentric, cylindrical filter elements 35, 36. The interior filter element 36 is in effect a reserve or auxiliary filter, the opening 42 of which is normally blocked by a valve assembly 43. During operation, when fluid contamination causes substantial clogging of outer filter element 35, pressure will unseat a ball 46 of the valve assembly 43 to permit the inner filter 36 to function. While the filter system of the '138 patent may be suitable for some applications, it may lack certain beneficial features and functions.

One or more features of the fluid filter assembly disclosed herein may solve one or more of the problems set forth above and/or other problems in the art. The scope of the current disclosure, however, is defined by the attached claims, and not by the ability to solve any specific problem.

SUMMARY

According to one aspect of the present disclosure, a filter assembly includes a filter housing including a housing inlet and a housing outlet, and a filtering section located downstream of the housing inlet and upstream of the housing outlet. The filtering section includes a first filtering portion, a second filtering portion, a wall longitudinally separating the first filtering portion and the second filtering portion, a filtering outlet, and a valve located in the filtering outlet. The valve includes a closed condition and an open condition, and wherein, in the valve closed condition the valve blocks flow from the second filtering portion to the housing outlet.

According to another aspect of the present disclosure, a filter system includes a filter housing including a housing inlet and a housing outlet, and a filtering section located downstream of the housing inlet and upstream of the housing outlet. The filtering section includes a first filtering portion, a second filtering portion, a filtering outlet, a valve located in the filtering outlet, the valve having a closed condition and an open condition, and wherein, in the valve closed condition the valve blocks flow from the second filtering portion to the housing outlet, and a valve sensor configured to identify when the valve has moved to an open condition.

According to yet another aspect of the present disclosure, a method for determining a filter status is disclosed. The method includes a filter assembly having a filter housing including a housing inlet and a housing outlet; and a filtering section located downstream of the housing inlet and upstream of the housing outlet, the filtering section including a first filtering portion, a second filtering portion, a filtering outlet, and a valve located in the filtering outlet and separating the first filtering portion and the second filtering portion. The method includes filtering through the first filtering portion, but not through the second filtering portion, opening the valve when the first filtering portion reaches a loaded condition; filtering through the second filtering portion when the valve is open, and sensing the opening of the valve and providing a notification of filter status based on the opening of the valve.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term "fluid" is broadly used to refer to all types of fluids, including liquids or gases that may be filtered in a machine or equipment (e.g., hydraulic fluid, oil, gasoline, air, etc.). Moreover, in this disclosure, relative terms, such as, for example, "about," "generally," "substantially," and "approximately" are used to indicate a possible variation of ±10% in the stated value.

Figure 1:
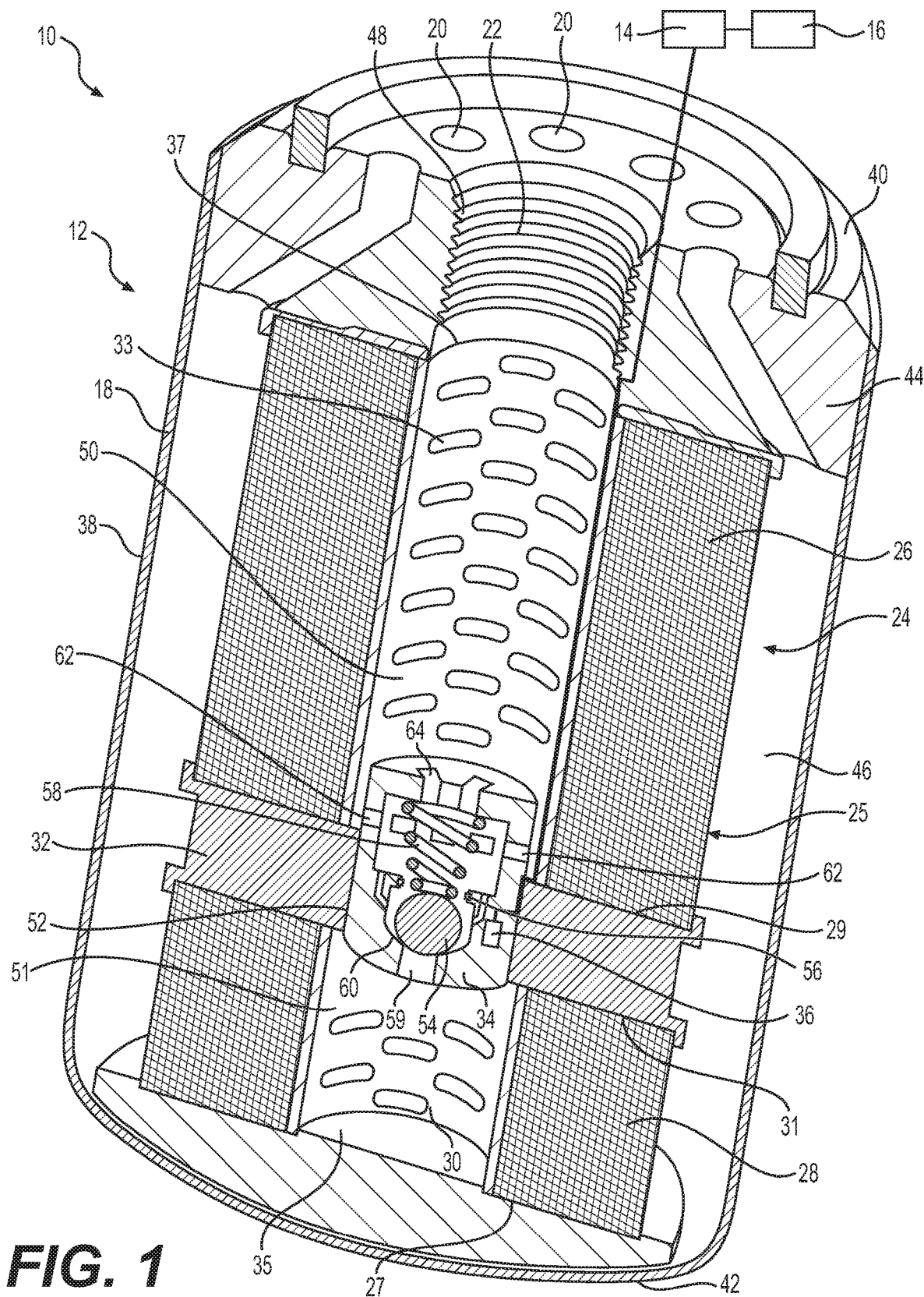
FIG. 1 is a schematic cross-sectional view of a filter system according to aspects of this disclosure.

FIG. 1 illustrates a schematic cross-sectional view of an exemplary filter system 10. Filter system 10 may filter any appropriate fluid. For example, filter system 10 may filter a hydraulic fluid, engine oil, or fuel, according to aspects of the present disclosure. As shown in FIG. 1, the filter system 10 may include the basic components of a filter assembly 12, a controller 14, and an output device 16.

Filter assembly 12 may include a filter housing 18 having one or more inlets 20 and outlets 22. Filter assembly 12 may also include a filtering section 24 located downstream of the housing inlet 20 and upstream of the housing outlet 22. Filtering section 24 may include a first filtering portion 26, a second filtering portion 28, a filtering outlet 30, a wall 32, and a valve 34. Valve 34 may be secured to wall 32 and may extend across the filtering outlet 30, thereby separating the first filtering portion 26 and the second filtering portion 28. A valve sensor 36 may be associated with valve 34 and configured to identify when the valve 34 has moved to an open condition.

Filter housing 18 may include an outer shell 38 including a top or proximal end 40, and a bottom or distal end 42. The outer shell 38 may form a filter canister for the filter assembly 12, and may have a generally cylindrical shape. The top end 40 of outer shell 38 may receive a cap 44 of filter housing 18. The cap 44 may include one or more passages forming a housing inlet 20, and one or more passages forming a housing outlet 22. In one example, as shown in FIG. 1, cap 44 may include a plurality of inlets 20 that radially surround a single central housing outlet 22. The housing outlet 22 may include threads for mating with a threaded male connector (not shown) associated with a fluid supply. The bottom end 42 of outer shell 38 may abut a distal end 27 of filtering section 24. Outer shell 38 may be wider than filtering section 24 so as to form a circumferential inlet gap 46 surrounding the filtering section. Inlet gap 46 is fluidly located downstream of the fluid inlets 20, and upstream of the filtering section 24. Although housing 18 is shown as substantially cylindrical, this disclosure is not so limited. For example, the filter housing 18 may be merely elongated, in that a longitudinal length of the housing 18 (e.g., the length between top end 40 and bottom end 42) may be longer than the width of the housing 18 (e.g., diameter of top end 40 or bottom end 42 if the housing 18 is cylinder), but not necessarily cylindrical in shape. Filter housing 18 may be any shape or configuration to surround or enclose filtering section 24.

As noted above, filtering section 24 may include a first filtering portion 26, a second filtering portion 28, a filtering outlet 30, a wall 32, and a valve 34. These features may be coupled together to form the filtering section 24, such that filtering section 24 may be a separate component of the filter assembly 12 and removably and replacably positioned within filter housing 18. Alternatively, filtering section 24 may be integrally connected (not separable) with filter housing 18. Filtering section 24 may be coupled between cap 44 and bottom end 42 of outer shell 38 such that filtering outlet 30 aligns with housing outlet 22.

Further, filtering section 24 may form an elongated, generally tubular shape, with the filtering outlet 30 forming the lumen of the tubular shape, and valve 34 located in the lumen. As used herein, an "elongated" component has a longitudinal length that is greater than a width of the component. An outer circumferential surface 25 of the elongated tubular structure of filtering section 24 may be generally uniform or coextensive in shape, and form an inlet of the filtering section 24.

First filtering portion 26 may have an elongated tubular shape and may be formed of a filtering media. The filtering media may be any appropriate permeable material, such as a fabric, plastic, woven material, non-woven material, or a combination of any of these materials or other filtering materials. As noted above, first filtering portion 26 may be longitudinally separated from second filtering portion 28 by wall 32, and may similarly be formed in an elongated tubular shape to be generally radially coextensive with the first filtering portion. Second filtering portion 28 may be formed of the same or a different filter media or permeability as the first filtering portion 26. As shown in FIG. 1, first filtering portion 26 may be located more proximal than second filtering portion 28, and first filtering portion 26 may be longer (larger in a longitudinal direction) than second filtering portion 28. For example, the length of the first filtering portion 26 may make up 60%, 70%, 80%, or 90% of the combined length of the first and second filtering portions 26, 28. It is also contemplated that the first and second filtering portions may have the same length.

As noted above, wall 32 may be coupled between first and second filtering portions 26, 28. Wall 32 may be disc shaped as shown in FIG. 1, or may be another shape. Further, wall 32 may be generally coextensive with the outer and inner diameters of first and second filtering portions 26, 28. Thus, wall 32 longitudinally separates the first and second filtering portions 26, 28. Wall 32 may be formed of any solid, nonpermeable material so as to prohibit flow of fluid from first filtering portion 26 into second filtering portion 28, for example from a distal end 29 of first filtering portion 26 to a proximal end 31 of second filtering portion 28. For example, wall 32 may be formed of a metallic material, polymeric material, etc.

Valve 34 may be secured to an inner diameter of wall 32 and located in the filtering outlet 30. Valve 34 separates filtering outlet 30 into a first filtering outlet 50 and a second filtering outlet 51. Valve 34 may be a unit check valve as shown in FIG. 1, and may include a valve housing 52, valve element such as a ball 54, valve element stopper 56, such as a plurality of elastomeric members 56, and biasing element, such as a spring 58. Valve housing 52 may include a valve inlet 59, a valve seat 60, one or more side outlets 62, and top outlets 64. Valve inlet 59 may be located at bottom or distal end of valve housing 52 to be in fluid communication with second filtering outlet 51, and valve outlets 62, 64 may be in fluid communication with first filtering outlet 50. Ball 54 is urged by spring 58 against valve seat 60 to keep the valve 34 in a closed condition. As will be discussed in more detail below, valve 34 may be selected with a cracking pressure corresponding to when first filtering portion 26 reaches a predetermined loaded condition (e.g., a maximum loading). The cracking pressure is a minimum pressure differential between the first filtering outlet 50 and second filtering outlet 51 that moves the ball 54 off the valve seat 60, and thus places the valve 34 in the open condition. Once in the open condition, valve element stopper 56 may keep ball 54 from returning to the valve seat 60, thus keeping valve in the open condition regardless minor variations in the pressure differential across the valve 34. It is understood that valve 34 includes grooves and/or passages that allow fluid to flow from the valve inlet 59 to the valve outlets 62, 64 when the valve is retained in the open condition by valve element stopper 56.

Sensor 36 is configured to track movement of valve element 54 and/or indicate when valve 34 has moved to an open condition. Sensor 36 may be, for example, a proximity sensor positioned within or adjacent valve 34 and configured to sense movement of valve 34 and provide signals to controller 14 indicating the movement of valve 34. Sensor 36 may be of any conventional type or design, and may be wired (as shown in FIG. 1) or wirelessly connected to controller 14. Further, sensor 36 may be positioned at any location appropriate to sense movement of valve 34. In an alternative arrangement, sensor 36 could be replaced with one or more pressure sensors located upstream and/or downstream of the filter assembly 12 to obtain direct pressure values, or a delta pressure value across the filter assembly 12. Such pressure sensors could be located at any appropriate location with respect to filter assembly 12, and could be of any conventional design. In such an arrangement, a measured pressure spike or a reduction in delta pressure across the filter could provide an indirect indication of the movement of valve 34 to the open condition.

Controller 14 may include any appropriate hardware, software, firmware, etc. to carry out the methods described in this disclosure. For, example, controller 14 may include one or more processors, memory, communication systems, and/or other appropriate firmware and hardware. The processors may be, for example, a single or multi-core processor, a digital signal processor, microcontroller, a general purpose central processing unit (CPU), and/or other conventional processor or processing/controlling circuit or controller. The memory may include, for example, read-only memory (ROM), random access memory (RAM), flash or other removable memory, or any other appropriate and conventional memory. The communication systems used in or with controller 14 may include, for example, any conventional wired and/or wireless communication systems. Controller 14 may be configured to send data or signals to, and receive data or signals from, sensor 36. Based on the signals or data received from sensor 36 or other appropriate sensor or sensors (e.g., when valve 34 is in the open condition), controller 14 may determine a filter status, including a filter loaded condition, a filter malfunction condition, or a predicted filter life remaining. Details of filter loaded condition, filter malfunction condition, or predicted filter life remaining are described below.

Controller 14 may be coupled with output device 16 to send data or signals to and receive data or signals from output device 16. Output device 16 may be any device that provides an output. For example, output device may include be a speaker providing audio output, an illumination system such as a warning light or lights, a display device of a machine on which the filter assembly 12 is connected, a mobile device (e.g., smartphone, tablet, pager, personal digital assistant (PDA)), a computer (e.g., laptop computer, desktop computer), or any other type of device that can provide an output from controller 14.

As noted above, filtering section 24 incldues a filtering outlet 30 including a first filtering outlet portion 50 and a second filtering outlet portion 51. Filtering outlet 30 may be tubular in shape and include a plurality of perforations 33 for allowing substantially unrestricted flow from first and second filtering portions 26, 28, as shown in FIG. 1. Further, filtering outlet 30 may be sized to be adjacent to an inner diameter of first and second filtering portions 26, 28. Filtering outlet 30 may have a closed distal end 35 and have an open proximal end 37 fluidly connected to housing outlet 22. The open proximal end 37 of filtering outlet 30 may be coextensive with the housing outlet 22 as shown in FIG. 1. Finally, filtering outlet 30 may be formed of any appropriate material, such as metal or plastic.

Figure 2:
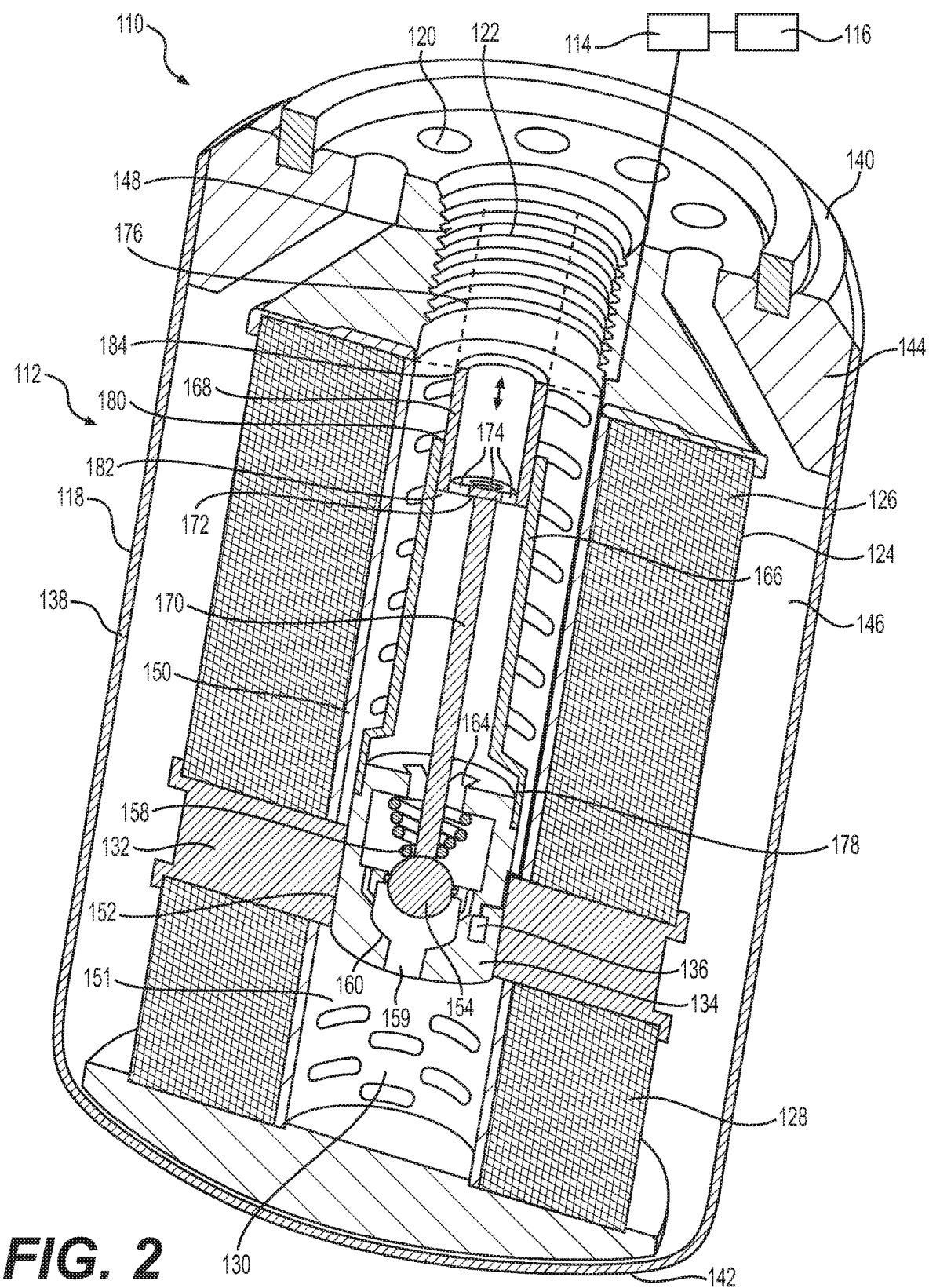
FIG. 2 is a cross-sectional view of another filter system according to aspects of this disclosure.

FIG. 2 illustrates an alternative filter system 110 with similar elements to filter system 10 shown by 100 added to the reference numbers. Specifically, FIG. 2 illustrates a partially schematic cross-sectional view of a filter system 110. Filter system 110 may include a filter assembly 112, a controller 114, and an output device 116, as discussed above. Additionally, as discussed above, filter assembly 112 may include a filter housing 118, and a filtering section 124 including a first filtering portion 126, a second filtering portion 128, and a valve 134.

The filter assembly 112 of FIG. 2 is different than the filter assembly 12 of FIG. 1 by providing a modified valve 134 and filtering outlet 130. Filtering outlet 130, and in particular first filtering outlet 150, may include a stationary sleeve 166 having a distal end 178 coupled to valve 134, and having an open proximal end 180. The open proximal end 180 of stationary sleeve 166 may slidingly receive a movable sleeve 168. Movable sleeve 168 may be coupled to the movable valve element or ball 154 of valve 134 so that movable sleeve 168 translates longitudinally within stationary sleeve 166 with the movement of valve element or ball 154. Moveable sleeve 168 may be coupled to the movable valve element 154 in any appropriate connection, such as with a connecting bar 170 as shown in FIG. 2. The movable sleeve 168 has a length and diameter so that when the movable sleeve 168 is extended proximally when the valve 134 moves to the open condition, a distal end 182 of the movable sleeve 168 remains within stationary sleeve 166, and a proximal end 184 of the movable sleeve 168 engages with a male connector (not shown, but indicated with dashed lines 176 in FIG. 2) on which filter assembly 112 is coupled (by the female connection including threads 148 of housing outlet 122). FIG. 2 shows valve 134 in the open condition and movable sleeve 168 engaged with male connector 176. The engagement of the proximal end 184 of the movable sleeve 168 with the male connector 176 may abut or otherwise interlock with the male connector 176 to form a generally sealed interface. When the movable sleeve 168 is in the retracted position, corresponding to a closed condition of valve 134, a gap exists between the proximal end 184 of the movable sleeve 168 and the male connector 176. The gap may be sized so as not to cause a significant pressure restriction. Accordingly, when the movable sleeve 168 is extended proximally, corresponding to an open condition of valve 134, a generally sealed pathway is formed from second filtering outlet 151, through open valve 134, through the lumen of stationary sleeve 166, through the lumen of movable sleeve 168, and to the male connector 176 at housing outlet 122. Further, in this extended position of movable sleeve 168, flow from first filtering outlet 150 is generally blocked by movable sleeve 168 from exiting to the male connector 176 at housing outlet 122. Thus, movable sleeve 168 isolates the first filter portion 126 from housing outlet 122 when the valve 134 is in the open condition. Such isolation helps to ensure that, once valve 134 is open, filtering takes place in second filter portion 128. It is understood that numerous alternative valve and sleeve configurations may be used to provide the isolation of first filtering portion described in connection with FIG. 2.

INDUSTRIAL APPLICABILITY

The disclosed filter assemblies 12, 112 may be used in any fluid system requiring filtering, such as hydraulic systems, engine systems, and/or cooling systems to assist in determining when the filter assembly 12, 112 needs replacement.

Figure 3:
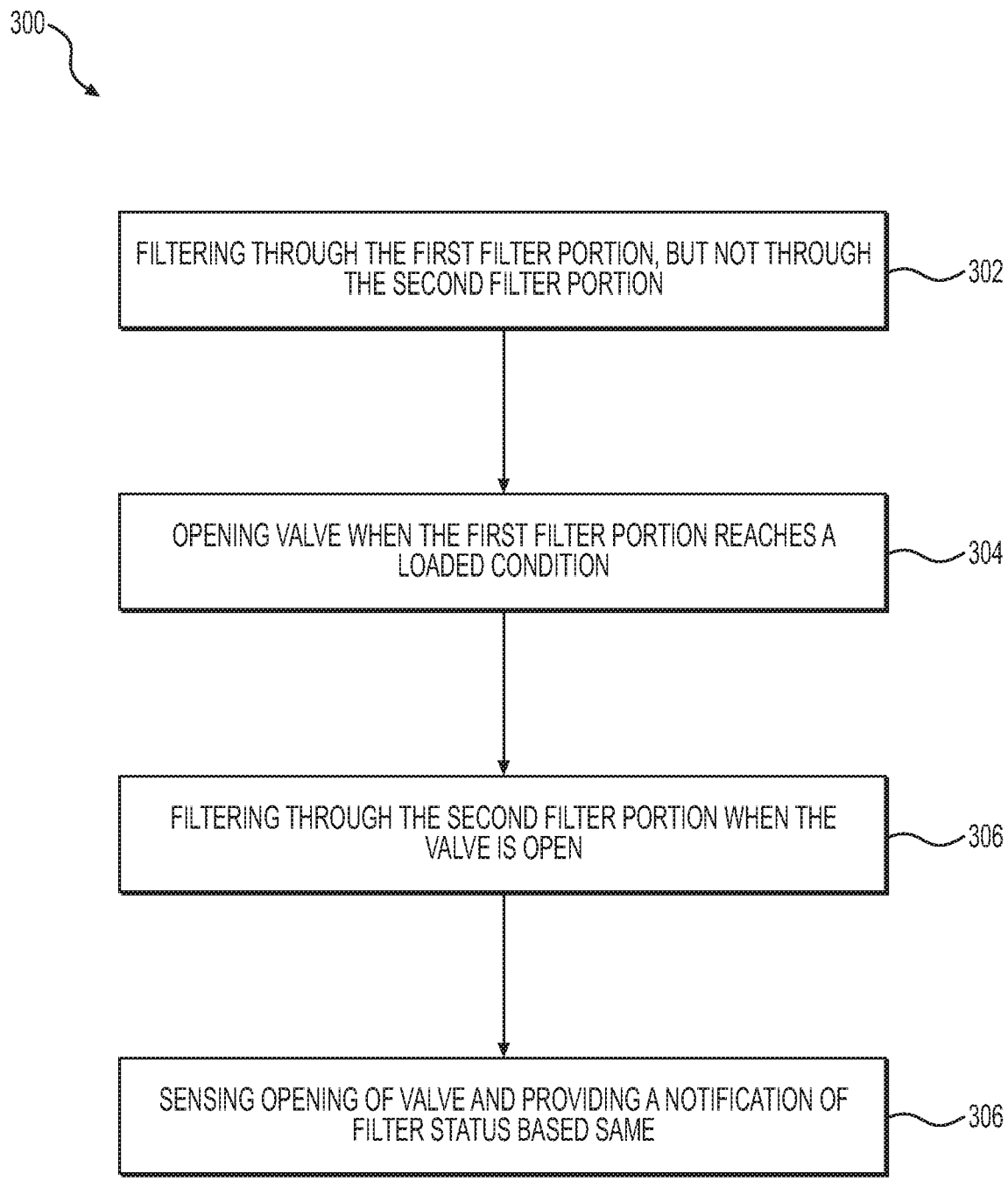
FIG. 3 is an exemplary method according to aspects of this disclosure.

FIG. 3 shows an exemplary method 300 of determining a filtering section status according to aspects of this disclosure. Method 300 may comprise a first step 302 of filtering through the first filtering portion 26, 126, but not through the second filtering portion 28, 128. Flow from the second filtering portion is prohibited from exiting the filter assembly 12, 112 by the closed condition of valve 34, 134. During step 302, fluid may enter into inlet gap 46, 146 from housing inlets 20, 120, pass through first filtering portion 26, 126, enter into first filtering outlet 50, 150, and exit filter assembly 12, 112 through housing outlet 22, 122.

Method 300 may further comprise a step 304 of opening the valve 34, 134 when the first filtering portion 26, 126 reaches a loaded condition, corresponding to a pressure differential across the valve 34, 134 sufficient to open the valve 34, 134. As indicated above, valve element or ball 54, 154, once moved to the open condition, may be secured in the open condition by valve element stopper 56. Method 300 may further comprise a step 306 of filtering through the second filtering portion 28, 128 when the valve 34, 134 is open. In one example, as shown in FIG. 1, during step 306, fluid may enter into inlet gap 46 from housing inlets 20, pass through second filtering portion 28, enter into second filtering outlet 51, pass through valve 34, enter into first filtering outlet 50, and exit filter assembly 12 through housing outlet 22. In another example, as shown in FIG. 2, during step 306, fluid may enter into inlet gap 146 from housing inlets 120, pass through second filtering portion 128, enter into second filtering outlet 151, pass through valve 134, enter into stationary sleeve 166, and exit filter assembly 112 through movable sleeve 168. Method 300 may further comprise a step 308 of sensing the opening of the valve 34, 134 and providing a notification of filtering section status based on the opening of the valve 34, 134, for example to output device 116.

The filtering section status may include one or more of (1) a filter fully loaded condition, (2) a filter malfunction condition, or (3) a predicted filter life remaining, all based on the sensing of the opening of the valve 34, 134. A notification of the filtering section status may be provided to an operator of the equipment/machine that is using the filter assembly 12, 112, maintenance personnel that would clean or replace the filter assembly 12, 112, and/or a dealer or fleet manager associated with the equipment/machine that is using the filter assembly 12. As used herein, a "fully loaded" filter corresponds to a filter that has been saturated to a predefined or desired extent. Such an loading may correspond to, for example, a particular loading before the first filtering portion 26, 126 is not longer capable of efficiently filtering, or the loading that will no longer efficiently provide filtering through the first filtering portion 26, 126.

Providing a filter fully loaded condition status may include providing an output indicating that it is time to replace the filter assembly 12, 112 or the filtering section 26, 28, 126, 128 thereof. For example, when sensor 36, 136 senses the opening of the valve 34, 134, which corresponds to a full loading of the first filtering portion 26, 126, controller 14, 114 receives signals from sensor 36, 136, and sends signals to output device 16, 116 to indicate that it is time to replace the filter assembly 12, 112. As noted above, the output could take any form, such as audible and/or visual output. After this notification of the filter loaded condition, the filter assembly 12, 112 can continue to adequately filter the fluid via second filtering portion 28, 128 while the new filter assembly 12, 112 is ordered and/or obtained and replaced. The size of second filtering portion 68, 168 may be selected to provide the desired time to obtain and install the new filter assembly 12, 112. Further, the output device 16, 116 may provide a countdown or other indication of the loading of second filtering portion 28, 128.

Outputting a filter malfunction condition via output device 16 is also possible with the disclosed filter system 10, 100. For example, controller 14, 114 may run a timer corresponding to when the filter assembly 12, 112 was installed, and include data or an algorithm for determining an expected or predicted life of the filter assembly 12, 112, and in particular, an expected life of first filtering portion 26, 126. If the valve 34, 134 is sensed to open in an unexpected time (e.g., before or after the expected life), controller 14, 114 may send signals to output device 16 to indicate a filter malfunction.

The disclosed filter system 10, 110 may also provide a predicted filter life remaining based on the opening of valve 34, 134. For example, controller 14, 114 may include data regarding when the filter was installed and the size difference between the first filtering portion 26, 126 and the second filtering portion, 28, 128. When sensor 36, 136 indicates a valve open condition, controller 14, 114 may use charts or algorithms to predict the when the second filtering portion 28, 128 will be in a fully loaded condition, and provide a time remaining, countdown, or other output via output device 16, 116 corresponding to when the filter assembly 12, 112 will reach a fully loaded condition. For example, if first filtering portion 26, 126 and second filtering portion 28, 128 have the same material, but the size of first filtering portion 26, 126 is twice the size of the second filtering portion 28, 128, a predicted filter life remaining of second filtering portion 28, 128, and thus the whole filter assembly 12, 112, may be 50% of the time from filter installation to a sensed open condition of valve 34, 134. In another example, if the first filtering portion 26, 126 and second filtering portion 28, 128 have the same material and size, and the measured life time of first filtering portion 26, 126 is 500 hours (when valve 34, 134 is in the open condition), then a predicted filter life remaining may be 500 hours for second filtering portion 28, 128.

Filter assemblies 12, 112 described herein may provide a quicker and less complicated way to accurately check filter loading and predict filter life. For example, isolating the first filtering portion 26, 126 as provided in the system of FIG. 2 may provide a more accurate determination of remaining filter life by ensuring that the filtered flow is only through the second filtering portion 28, 128. Therefore, the disclosed filter assemblies 12, 112 may be reliable and reduce cost, without sacrificing performance.

It will be apparent to those skilled in the art that various modifications and variations can be made to the disclosed system without departing from the scope of the disclosure. Other embodiments of the system will be apparent to those skilled in the art from consideration of the specification and practice of filter assembly disclosed herein. It is intended that the specification and examples be considered as exemplary only, with a true scope of the disclosure being indicated by the following claims and their equivalents.

What is claimed is:

1. A filter assembly, comprising:
   a filter housing including a closed distal end and a proximal end, the proximal end including a housing inlet and a housing outlet; and
   a filtering section located downstream of the housing inlet and upstream of the housing outlet, the filtering section including:
   a first filtering portion,
   a second filtering portion, the first and second filtering portions being coaxial with the housing outlet,
   a wall longitudinally separating the first filtering portion and the second filtering portion,
   a filtering outlet positioned radially within the first filtering portion or the second filtering portion,
   a valve located radially within the filtering outlet, the valve having a closed condition and an open condition, and wherein, in the closed condition the valve blocks flow from the second filtering portion to the housing outlet,
   a stationary sleeve having a proximal end and a distal end, the distal end being coupled to the valve, and
   a movable sleeve extending proximally of the stationary sleeve such that the stationary sleeve defines an enclosed fluid path from the valve to the movable sleeve, the movable sleeve being connected to a valve element of the valve such that the valve element is configured to cause a proximal end of the movable sleeve to move proximally away from the stationary sleeve when the valve moves from the closed condition to the open condition.

2. The filter assembly of claim 1, wherein the first filtering portion, second filtering portion, and filtering outlet are generally radially coextensive.

3. The filter assembly of claim 2, wherein the filtering section forms an elongated tube structure and an outer surface of the elongated tube structure forms an inlet of the first filtering portion and the second filtering portion.

4. The filter assembly of claim 3, wherein the valve is secured within an opening in the wall.

5. The filter assembly of claim 4, wherein the first filtering portion is longer than the second filtering portion.

6. The filter assembly of claim 4, wherein the valve includes a valve element urged in the closed condition by a biasing element.

7. The filter assembly of claim 6, wherein the biasing element is configured to allow the valve to move to the open condition when the first filtering portion reaches a fully loaded condition.

8. The filter assembly of claim 7, wherein the valve includes a stopper maintaining the valve element in the open condition.

9. The filter assembly of claim 8, wherein the movable sleeve is sized to substantially block fluid communication between the first filtering portion and the housing outlet when the valve is in the open condition.

10. A filter system, comprising:
a filter housing including a closed distal end and a proximal end, the proximal end including a housing inlet and a housing outlet; and
a filtering section located downstream of the housing inlet and upstream of the housing outlet, the filtering section including:
a first filtering portion,
a second filtering portion, the first and second filtering portions being coaxial with the housing outlet,
a wall longitudinally separating the first filtering portion and the second filtering portion,
a filtering outlet positioned radially within the first filtering portion or the second filtering portion,
a valve located radially within the filtering outlet, the valve having a closed condition and an open condition, and wherein, in the closed condition the valve blocks flow from the second filtering portion to the housing outlet, and
a valve sensor configured to identify when the valve has moved to an open condition, the valve sensor being a proximity sensor that extends radially within the wall, the proximity sensor being out of contact with a valve element when the valve is in the closed condition and when the valve is in the open condition.

11. The filter system of claim 10, wherein the sensor is located inside of the filtering outlet and connected to a controller, and the controller provides a notification of filtering section status.

12. The filter system of claim 11, wherein the filtering section status includes at least one of a filter fully loaded condition, a filter malfunction condition, or a predicted filter life remaining, all based on an identification of when the valve has moved to the open condition.

13. The filter system of claim 12, wherein the sensor includes a sensor element coupled to the valve and spaced away from the valve element.

14. The filter system of claim 13, wherein the filtering section forms an elongated tube structure and an outer surface of the elongated tube structure forms an inlet of the first filtering portion and the second filtering portion, and a wall separates the first filtering portion from the second filtering portion.

15. The filter system of claim 14, wherein the valve is coupled to a movable sleeve via a stationary sleeve, the movable sleeve being sized to substantially block fluid communication between the first filtering portion and the housing outlet when the valve is in the open condition, due to motion of the movable sleeve away from the valve when the valve moves from the closed position to the open position.

16. A method for determining a filter status including a filter assembly having a filter housing including a housing inlet and a housing outlet; and a filtering section located downstream of the housing inlet and upstream of the housing outlet, the filtering section including a first filtering portion, a second filtering portion, a filtering outlet, and a valve located in the filtering outlet and separating the first filtering portion and the second filtering portion, the method comprising:
filtering through the first filtering portion, but not through the second filtering portion;
opening the valve when the first filtering portion reaches a loaded condition;
filtering through the second filtering portion when the valve is open;
sensing the opening of the valve with a sensor that extends radially within the filtering outlet in response to movement of a valve element from a closed position in which axial flow through the valve is prohibited to an open position that permits axial flow through the valve, the sensor including a sensor element spaced away from the valve element when the valve element is in the open position during filtering through the second portion; and
providing a notification of filter status based on the sensed opening of the valve based on an electronic signal received by a controller from the sensor.

17. The method of claim 16, wherein the filter status includes at least one of a filter loaded condition, a filter malfunction condition, or a predicted filter life remaining, based on the sensing of the opening of the valve.

18. The method of claim 17, wherein the filtering through the second filtering portion includes not filtering through the first filtering portion.

19. The method of claim 18, wherein the predicted filter life remaining is based on a difference in size between the first and second filtering portions.

* * * * *